United States Patent
Masada et al.

(10) Patent No.: US 10,280,322 B2
(45) Date of Patent: May 7, 2019

(54) INK, INK CARTRIDGE, AND IMAGE RECORDING METHOD

(71) Applicant: CANON KABUSHIKI KAISHA, Tokyo (JP)

(72) Inventors: Yohei Masada, Tokyo (JP); Masahiro Terada, Hadano (JP); Hidetaka Kawamura, Yokohama (JP); Akihiro Taya, Yokohama (JP); Masanobu Ootsuka, Tokyo (JP); Takaharu Aotani, Tokyo (JP); Shoji Koike, Yokohama (JP); Yutaka Yoshimasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/729,813

(22) Filed: Oct. 11, 2017

(65) Prior Publication Data
US 2018/0112091 A1   Apr. 26, 2018

(30) Foreign Application Priority Data
Oct. 21, 2016   (JP) .................................. 2016-206518

(51) Int. Cl.
*C09D 11/322* (2014.01)
*C09D 11/326* (2014.01)
(Continued)

(52) U.S. Cl.
CPC .......... *C09D 11/322* (2013.01); *C09D 11/106* (2013.01); *C09D 11/107* (2013.01);
(Continued)

(58) Field of Classification Search
CPC ... C09D 11/322; C09D 11/106; C09D 11/326; C09D 11/108; C09D 11/107; B41J 2/17503
See application file for complete search history.

(56) References Cited

U.S. PATENT DOCUMENTS 6,533,407 B2   3/2003   Mouri et al.
6,932,467 B2   8/2005   Kawamura
(Continued)

FOREIGN PATENT DOCUMENTS

EP   1 167 470 A1 *   1/2002   ............. C09D 11/00
JP   2002-088289 A    3/2002
(Continued)

OTHER PUBLICATIONS

Yuan Yu et al., "Coagulation Kinetics of Surface Modified Pigment Particles," International Conference on Digital Printing Technologies, Sep. 2002, pp. 383-387.
(Continued)

*Primary Examiner* — Geoffrey S Mruk
(74) *Attorney, Agent, or Firm* — Venable LLP

(57) ABSTRACT

An ink including a first pigment, a second pigment, and water. The first pigment satisfies condition 1, the second pigment satisfies condition 2, and the content (% by mass) of the first pigment relative to the content (% by mass) of the second pigment based on a total mass of the ink is 1.7 times or more to 8.0 times or less in terms of mass ratio.

Condition 1: When, to a pigment dispersion liquid containing the first pigment, calcium chloride is added so as to give a predetermined concentration, the particle diameter increase rate of the solid content is 2.0 nm/second or more.

Condition 2: When, to a pigment dispersion liquid containing the second pigment, hydrochloric acid is added so as to give a predetermined concentration, the particle diameter increase rate of the solid content is 0.5 nm/second or less.

12 Claims, 1 Drawing Sheet (51) Int. Cl.
*B41J 2/175* (2006.01)
*C09D 11/107* (2014.01)
*C09D 11/108* (2014.01)
*C09D 11/106* (2014.01)

(52) U.S. Cl.
CPC .......... *C09D 11/108* (2013.01); *C09D 11/326* (2013.01); *B41J 2/17503* (2013.01)

(56) References Cited

U.S. PATENT DOCUMENTS

| | | |
|---|---|---|
| 8,858,695 B2 | 10/2014 | Gu et al. |
| 9,315,683 B2 | 4/2016 | Nagai et al. |
| 9,725,598 B2 | 8/2017 | Burns et al. |
| 9,732,227 B2 | 8/2017 | Gu et al. |
| 2015/0184009 A1 | 7/2015 | Tsuji et al. |
| 2017/0210917 A1 | 7/2017 | Aotani et al. |
| 2017/0210918 A1 | 7/2017 | Masada et al. |
| 2017/0306156 A1 | 10/2017 | Burns et al. |
| 2017/0306157 A1 | 10/2017 | Gu et al. |

FOREIGN PATENT DOCUMENTS

| | | |
|---|---|---|
| JP | 5001292 B2 | 8/2012 |
| JP | 2013-253234 A | 12/2013 |

OTHER PUBLICATIONS

Jan. 30, 2018 extended European Search Report in European Patent Appln. No. 17196743.3.

\* cited by examiner

INK, INK CARTRIDGE, AND IMAGE RECORDING METHOD

BACKGROUND OF THE INVENTION

Field of the Invention

The present invention relates to an ink, an ink cartridge, and an image recording method.

Description of the Related Art

An ink jet recording method enables easy recording of high-quality color images even though the principle thereof is simple. Hence, the technique for the ink jet recording method has been markedly improved, and the ink jet recording method is not only used to record documents and photographs for home use, which has been a main target, but is now rapidly spreading in office and industrial applications. Recently, a long line head has been developed and enables recording of an image with a head width at a time. On this account, the ink jet recording method has been adopted also in the commercial printing industry where higher speed printing is required.

The commercial printing industry requires such performance as to enable mass printing at low cost. On this account, it is desired to enable printing of high-quality images even on inexpensive thin paper, which is generally called printing paper and is widely used. In particular, when a pigment ink is used to record images on the paper classified into high-quality paper or fine coated paper, the ink is likely to infiltrate into the paper as well as the pigment also moves into the paper, and thus the resulting image is likely to have a lower optical density. To address this problem, a method in which the amount of a surfactant contained in an ink is reduced to suppress the infiltration characteristics of the ink into a recording medium, and the optical density of an image is improved is known. Another method in which a functional group having a high calcium index is selected and bonded to the particle surface of a pigment, and the pigment is allowed to aggregate immediately on a recording medium to improve the optical density of an image is also known. However, these methods may cause other problems including ink fixation in a nozzle and insufficient image fastness.

To solve these problems, an ink containing two types of pigments has been disclosed. For example, in order to prevent the fixation in an ejection nozzle, an ink containing a plurality types of self-dispersible pigments has been disclosed (Japanese Patent Application Laid-Open No. 2013-253234). In order to achieve image fastness, an ink containing a self-dispersible pigment and a resin-dispersed pigment has been disclosed (Japanese Patent No. 5001292).

SUMMARY OF THE INVENTION

The present invention is directed to providing an ink capable of improving the optical density of a recorded image and of enlarging the dot diameter to record high-quality images, an ink cartridge including the ink, and an image recording method.

An aspect of the present invention provides an ink including a first pigment, a second pigment, and water. In the ink, the first pigment satisfies condition 1, the second pigment satisfies condition 2, and a content (% by mass) of the first pigment relative to a content (% by mass) of the second pigment based on a total mass of the ink is 1.7 times or more to 8.0 times or less in terms of mass ratio.

Condition 1: When, to a first pigment dispersion liquid containing the first pigment and water and having a content of the first pigment of 0.01% by mass, calcium chloride is added so as to give a concentration of 1.0 mM, a particle diameter increase rate of a solid content is 2.0 nm/second or more.

Condition 2: When, to a second pigment dispersion liquid containing the second pigment and water and having a content of the second pigment of 0.01% by mass, hydrochloric acid is added so as to give a concentration of 0.5 mM, a particle diameter increase rate of a solid content is 0.5 nm/second or less.

Another aspect of the present invention provides an ink cartridge including an ink and an ink storage portion storing the ink, and the ink is the above-described ink.

Still another aspect of the present invention provides an image recording method including an ink application step of applying an ink to a recording medium, and the ink is the above-described ink.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

By using an ink having the formulation disclosed in Japanese Patent Application Laid-Open No. 2013-253234 or Japanese Patent No. 5001292, the optical density of a recorded image is improved to some extent. However, the ink has lower infiltration characteristics, and thus the effect of enlarging the dot diameter is reduced. On this account, the dot formed by application of the ink to a recording medium is likely to have a smaller diameter, and a solid image recorded especially by high-speed printing is likely to include streaky lines in some cases. As a result of intensive studies for providing an ink capable of improving the optical density of a recorded image and of enlarging the dot diameter to record high-quality images, an ink cartridge, and an image recording method, the inventors of the present invention have completed the present invention.

The present invention will now be described in further detail with reference to preferred embodiments. In the present invention, when a compound is a salt, the salt dissociates into ions in an ink, but such a case is expressed as "containing a salt" for convenience. An aqueous ink for ink jet may be simply called "ink". Physical property values are values determined at normal temperature (25° C.) unless otherwise noted.

The inventors of the present invention have studied an ink containing a first pigment, a second pigment, and water. The result reveals that the optical density of a recorded image can be improved and the dot diameter can be enlarged to record high-quality images when the following requirements (i) to (iii) are satisfied.

(i) The first pigment satisfies condition 1.

Condition 1: When, to a first pigment dispersion liquid containing the first pigment and water and having a content of the first pigment of 0.01% by mass, calcium chloride is added so as to give a concentration of 1.0 mM, the particle diameter increase rate of a solid content is 2.0 nm/second or more.

(ii) The second pigment satisfies condition 2.

Condition 2: When, to a second pigment dispersion liquid containing the second pigment and water and having a content of the second pigment of 0.01% by mass, hydrochloric acid is added so as to give a concentration of 0.5 mM, the particle diameter increase rate of a solid content is 0.5 nm/second or less.

(iii) The mass ratio of the content (% by mass) of the first pigment to the content (% by mass) of the second pigment is 1.7 to 8.0 based on the total mass of the ink.

The inventors of the present invention suppose that an ink satisfying the above requirements can improve the optical density of a recorded image and enlarge the dot diameter to record high-quality images by the following mechanism.

In order to record an image having a high optical density by using an ink containing a pigment as the coloring material, it is required to suppress the infiltration of the pigment in the ink into a recording medium as much as possible and to fix the pigment near the surface of the recording medium. In other words, it is supposed that an image having a high optical density can be recorded when the pigment is allowed to immediately aggregate and is prevented from infiltrating into a recording medium. In order to allow the pigment to immediately aggregate near the surface of a recording medium, the following measures are required, for example: a dispersion condition is broken by environmental changes due to ion concentration variations on a recording medium; or the pigment is reacted with ions eluted from a recording medium by application of ink drops and is allowed to aggregate. More specifically, a method of adding, into an ink, a pigment having, on the particle surface thereof, a functional group reactive with ions discharged from a recording medium is exemplified. In order to increase the optical density of a recorded image, the inventors of the present invention have found to use a pigment that is reactive with polyvalent metal ions such as calcium ions eluted from a recording medium and can aggregate immediately. In other words, an ink containing a first pigment satisfying the above condition 1 can improve the optical density of a recorded image.

When a pigment is fixed near the surface of a recording medium, the infiltration characteristics of an ink degrades, and thus the effect of enlarging the dot diameter is reduced. For example, when a solid image is recorded, the surface of a recording medium is thus failed to be buried, and problems including streaky lines are likely to occur. When an ink droplet containing the first pigment is applied to a recording medium, the first pigment reacts with polyvalent metal ions such as calcium ions eluted from the recording medium, then aggregates, and is fixed near the surface of a recording medium. As the first pigment aggregates, the proton of a functional group bonded to the particle surface of the first pigment is exchanged with a polyvalent metal ion to be discharged, and the ink droplet has a lower pH. It is supposed that when the lower pH causes pigments other than the first pigment to aggregate, the other pigments are fixed to the recording medium before sufficient infiltration of the pigments, and the dot diameter is prevented from being enlarged.

To address this problem, the inventors of the present invention have found that by adding, to an ink, a pigment (second pigment) that is unlikely to aggregate even at a lower pH together with the first pigment, the second pigment infiltrates and spreads, and the dot diameter can be enlarged. In other words, by adding a second pigment satisfying the above condition 2 to an ink together with the first pigment, the dot diameter can be enlarged to record high-quality images while a high optical density is maintained.

The particle diameter increase rate of a solid content slightly varies with the ink infiltration rate of a recording medium. The ink of the present invention is particularly effective as the ink for recording images on recording media including plain paper and ink jet recording paper having an ink infiltration coefficient of 0.1 $mL \cdot m^{-2} \cdot ms^{-1/2}$ or more to 3.0 $mL \cdot m^{-2} \cdot ms^{-1/2}$ or less determined by Bristow's method.

<Ink>

The ink of the present invention includes a first pigment, a second pigment, and water. Components constituting the ink of the present invention, physical properties of the ink, and the like will next be described in detail.

(First Pigment)

The first pigment satisfies the condition 1 shown below. The "solid content" in the condition 1 means an aggregate formed by reaction of the pigment with calcium ions of calcium chloride.

Condition 1: When, to a first pigment dispersion liquid containing the first pigment and water and having a content of the first pigment of 0.01% by mass, calcium chloride is added so as to give a concentration of 1.0 mM, the particle diameter increase rate of a solid content is 2.0 nm/second or more.

As the first pigment, a self-dispersible pigment in which a hydrophilic group is bonded to the particle surface of the pigment can be used. Such a self-dispersible pigment is preferably a phosphonic acid type self-dispersible pigment in which a phosphonic acid group is bonded to the particle surface of the pigment directly or through an additional atomic group. A phosphonic acid group —$PO(O[M1])_2$ may be dissociated partly or completely in an ink. In other words, the phosphonic acid group can be any form of —$PO_3H_2$ (acid form), —$PO_3H$-$M1^+$ (monobasic salt), and —$PO_3^{2-}$ ($M1^+$)$_2$ (dibasic salt). Here, M1 is independently at least one selected from the group consisting of a hydrogen atom, an alkali metal, ammonium, and an organic ammonium. Examples of the alkali metal represented by M1 include lithium, sodium, and potassium. Examples of the organic ammonium represented by M1 include alkylamines having a carbon number of 1 or more to 3 or less, such as methylamine and ethylamine; and alkanolamines having a carbon number of 1 or more to 4 or less, such as monoethanolamine, diethanolamine, and triethanolamine.

Examples of the additional atomic group (—R—) include linear or branched alkylene groups having 1 to 12 carbon atoms, arylene groups such as a phenylene group and a naphthylene group, an amido group, a sulphonyl group, an amino group, a carbonyl group, an ester group, and an ether group. Combination groups of them can also be exemplified. The additional atomic group (—R—) preferably contains at least one of alkylene groups and arylene groups and a group capable of forming a hydrogen bond (for example, an amido group, a sulphonyl group, an amino group, a carbonyl group, an ester group, and an ether group). In addition, the additional atomic group (—R—) is preferably a group containing —C$_6$H$_4$—CONH— (benzamide structure).

To carbon atoms of the additional atomic group (—R—), a plurality of phosphonic acid groups may be bonded. Specifically, a self-dispersible pigment in which an atomic group bonded to a bisphosphonic acid group or a triphosphonic acid group is bonded to the surface of pigment particles is preferably used. By using such a self-dispersible pigment, the image optical density can be further improved.

The substituent containing a hydrophilic group and an additional atomic group (—R—) and bonded to the particle surface of a pigment is preferably a group having the structure represented by —CQ(PO$_3$M$_2$)$_2$. In the formula, "Q" is R, OR, SR, or NR$_2$. "R" is independently a hydrogen atom, an alkyl group, an acyl group, an aralkyl group, or an aryl group. Examples of the alkyl group include a methyl group and an ethyl group. Examples of the acyl group include an acetyl group and a benzoyl group. Examples of the aralkyl group include a benzyl group. Examples of the aryl group include a phenyl group and a naphthyl group. The substituent containing a hydrophilic group and an additional atomic group (—R—) and bonded to the particle surface of a pigment is particularly preferably a group having the structure represented by —CH(PO$_3$M$_2$)$_2$.

Whether or not the self-dispersible pigment in an ink has a phosphonic acid group can be determined by analysis with an ICP emission spectrometer. Specifically, when an ICP emission spectrometer is used to analyze a sample, and a phosphorus element is identified, the self-dispersible pigment is determined to have a phosphonic acid group.

When a self-dispersible pigment other than the phosphonic acid type self-dispersible pigment is used as the first pigment, a self-dispersible pigment having a higher functional group introduction proportion is preferably used to further improve the image optical density. The first pigment preferably has a volume-based 50% cumulative average particle diameter (D$_{50}$) of 100 nm or more to 200 nm or less and more preferably 110 nm or more to 160 nm or less. A pigment having a larger particle diameter gives a larger contribution to an improvement of the optical density. However, a pigment having an excessively large particle diameter tends to interfere with ejection stability or storage stability, for example.

(Second Pigment)

The second pigment satisfies the condition 2 shown below. The "solid content" in the condition 2 means an aggregate of the pigment due to a lower pH by hydrochloric acid.

Condition 2: When, to a second pigment dispersion liquid containing the second pigment and water and having a content of the second pigment of 0.01% by mass, hydrochloric acid is added so as to give a concentration of 0.5 mM, the particle diameter increase rate of a solid content is 0.5 nm/second or less.

[Self-Dispersible Pigment]

As the second pigment, a self-dispersible pigment in which a hydrophilic group is bonded to the particle surface of the pigment directly or through an additional atomic group can be used. In the second pigment, the particle diameter increase rate of the solid content due to a lower pH is low, unlike the first pigment. The self-dispersible pigment used as the second pigment is preferably a pigment in which a hydrophilic group is bonded to the particle surface of the pigment through an additional atomic group. In order to increase the difference from the first pigment in the solid-liquid separation rate, the second pigment preferably has a certain high functional group introduction proportion.

Examples of the hydrophilic group include —COOM1 and —SO$_3$M1. M1 is a hydrogen atom, an alkali metal, ammonium, or an organic ammonium. Specifically, the second pigment is preferably a sulfonic acid type self-dispersible pigment in which a sulfonic acid group is bonded to the particle surface of the pigment directly or through an additional atomic group. Examples of the additional atomic group (—R—) include linear or branched alkylene group having 1 to 12 carbon atoms, arylene groups such as a phenylene group and a naphthylene group, an amido group, a sulphonyl group, an amino group, a carbonyl group, an ester group, and an ether group. Combination groups of them can also be exemplified.

Examples of the alkali metal represented by M1 include lithium, sodium, and potassium. Examples of the organic ammonium represented by M1 include alkylamines having a carbon number of 1 or more to 3 or less, such as methylamine and ethylamine; and alkanolamines having a carbon number of 1 or more to 4 or less, such as monoethanolamine, diethanolamine, and triethanolamine. When a hydrophilic group (anionic group) forms a salt, the hydrophilic group may be dissociated partly or completely in an ink.

The second pigment is preferably a self-dispersible pigment in which the group represented by —R1-SO$_3$M1 group is bonded to the particle surface of the pigment. In the formula, R1 is an alkylene group or an arylene group, and M1 is a hydrogen atom, an alkali metal, ammonium, or an organic ammonium. Preferred specific examples of R1 and M1 are the same as those specifically exemplified for R and M1. The second pigment is preferably a self-dispersible pigment prepared by reacting a pigment with a compound having an anionic group (treatment agent) by a diazo coupling method.

As the second pigment, a resin-bonded self-dispersible pigment can also be used. The resin-bonded self-dispersible pigment is preferably a pigment in which a functional group bonded to the particle surface of the pigment contains the structure of a copolymer of an ionic monomer and a hydrophobic monomer. Such a pigment is preferred because the copolymerization ratio of an ionic monomer and a hydrophobic monomer can be appropriately changed to control the hydrophilicity of the pigment. In addition, the types of an ionic monomer and a hydrophobic monomer and the combination of these monomers can be selected to impart various characteristics to the particle surface of a pigment, and thus such a pigment is preferred. When the hydrophilic group is a sulfonic acid group, an ICP emission spectrometer can be used to quantitatively determine sulfur, thereby measuring the introduction proportion of the hydrophilic group (sulfonic acid group).

[Resin-Dispersed Pigment]

As the second pigment, a resin-dispersed pigment dispersed by a resin (dispersion resin) can be used. The dispersion resin is preferably water-soluble. A resin "being water-soluble" is a resin having no particle diameter when the resin is neutralized with an equivalent amount of an alkali to the acid value. The dispersion resin is exemplified by acrylic ester polymers. The acrylic ester polymer is a copolymer having the constituent unit derived from an acrylic ester monomer and the constituent unit derived from an acrylic ester monomer having a hydroxy group.

Examples of the monomer having a hydroxy group include 2-hydroxyethyl (meth)acrylate, hydroxypropyl (meth)acrylate, polyethylene glycol mono(meth)acrylate, and polypropylene glycol mono(meth)acrylate. As the acrylic ester monomer to be copolymerized with the monomer having a hydroxy group, acrylic ester monomers for general purpose can be used. Specifically exemplified are methyl (meth)acrylate, ethyl (meth)acrylate, n-butyl (meth)acrylate, 2-ethylhexyl (meth)acrylate, cyclohexyl (meth)acrylate, and benzyl acrylate. In addition to the acrylic ester monomers, a monomer having a double bond copolymerizable with such a monomer can be used. Specifically exemplified are styrene, α-methylstyrene, vinyl acetate, and 1,3-butadiene.

As the dispersion resin, a resin prepared by saponification of a vinyl acetate-acrylic ester polymer that is obtained by copolymerization of an acrylic ester monomer and a vinyl acetate monomer, with a strong base such as sodium hydroxide can be used. The dispersion resin may have any structure including a linear structure, a branched structure, a random copolymer, and a block copolymer. A dispersion resin may be bonded to a pigment, or dispersion resins may be cross-linked with each other.

The dispersion resin preferably has a weight-average molecular weight of 3,000 or more to 15,000 or less and more preferably 5,000 or more to 12,000 or less in terms of polystyrene as determined by gel permeation chromatography (GPC). The dispersion resin preferably has an acid value of 80 mg KOH/g or more to 250 mg KOH/g or less and more preferably 100 mg KOH/g or more to 200 mg KOH/g or less. When a dispersion resin having an acid value within the range is used, the dispersion stability of a pigment can be improved, and thus a resin-dispersed pigment less susceptible to a lower pH can be prepared. The acid value of a dispersion resin can be determined by potentiometric titration.

[Pigment]

The pigment type is exemplified by organic pigments and inorganic pigments such as carbon black, and any pigment usable in an ink for ink jet recording can be used. A dye and the like can also be used in combination for toning, for example.

[Particle Diameter Increase Rate of Solid Content]

The particle diameter increase rate of a solid content when calcium chloride is added to a first pigment dispersion liquid can be determined with reference to the description in International Conference on Digital Printing Technologies, September 2002; pp. 383-387, Yuan Yu et al., "Coagulation Kinetics of Surface Modified Pigment Particles". In other words, a certain amount of an aqueous calcium chloride solution is added to a first pigment dispersion liquid, then the time course of the particle diameter of the solid content is observed, and the increase rate of the particle diameter is measured and calculated as the "particle diameter increase rate".

As the measurement device for the particle diameter of a solid content, a Fiber-Optics Particle Analyzer (trade name "FPAR-1000", manufactured by Otsuka Electronics) can be used. To a first pigment dispersion liquid having a first pigment content of 0.01% by mass, an aqueous calcium chloride solution in such an amount as to give a predetermined concentration is added, immediately followed by shaking three times to thereby effect mixing, and the measurement of the particle diameter of the solid content is immediately started. The particle diameter of the solid content is measured at 25° C. for 600 seconds at intervals of seconds. After the completion of the measurement, the initial slope of particle diameter changes is determined, and the particle diameter increase rate of the solid content can be calculated. Specifically, the initial slope is determined by approximation using the least squares method based on data measured within a time period of from 30 second to 180 seconds after stating the measurement.

The particle diameter increase rate of the solid content determined in accordance with the above procedure is 2.0 nm/second or more. When the particle diameter increase rate of the solid content is less than 2.0 nm/second, the first pigment is unlikely to aggregate. On this account, almost all the first pigment infiltrates into a recording medium, and thus a recorded image has a lower optical density.

The particle diameter increase rate of a solid content when hydrochloric acid is added to a second pigment dispersion liquid can also be determined by a similar procedure to the above. As the measurement device of the particle diameter of a solid content, a Fiber-Optics Particle Analyzer (trade name "FPAR-1000", manufactured by Otsuka Electronics) can be used. To a second pigment dispersion liquid having a second pigment content of 0.01% by mass, hydrochloric acid in such an amount as to give a predetermined concentration is added, immediately followed by shaking three times to thereby effect mixing, and the measurement of the particle diameter of the solid content is immediately started. The particle diameter of the solid content is measured at 25° C. for 600 seconds at intervals of seconds. After the completion of the measurement, the initial slope of particle diameter changes is determined, and the particle diameter increase rate of the solid content can be calculated. Specifically, the initial slope is determined by approximation using the least squares method based on data measured within a time period of from 30 second to 180 seconds after stating the measurement.

The particle diameter increase rate of the solid content determined in accordance with the above procedure is 0.5 nm/second or less. When the particle diameter increase rate of the solid content is more than 0.5 nm/second, the second pigment is likely to aggregate due to a reduction in pH of ink droplets associated with aggregation of the first pigment. On this account, the second pigment is unlikely to infiltrate into a recording medium, and the dot diameter is difficult to enlarge.

[Pigment Content]

The total content (% by mass) of the pigments in the ink is preferably 0.1% by mass or more to 15.0% by mass or less and more preferably 1.0% by mass or more to 10.0% by mass or less based on the total mass of the ink. The content (% by mass) of the first pigment in the ink is preferably 0.1% by mass or more to 10.0% by mass or less and more preferably 0.5% by mass or more to 5.0% by mass or less based on the total mass of the ink. The content (% by mass) of the second pigment in the ink is preferably 0.1% by mass or more to 10.0% by mass or less and more preferably 0.5% by mass or more to 5.0% by mass or less based on the total mass of the ink.

The mass ratio of the content (% by mass) of the first pigment to the content (% by mass) of the second pigment is 1.7 to 8.0 and preferably 2.0 or more to 5.0 or less based on the total mass of the ink. In other words, "content (% by mass) of first pigment"/"content (% by mass) of second pigment" is 1.7 or more to 8.0 or less and preferably 2.0 or more to 5.0 or less. When the mass ratio is less than 1.7, an image having a high optical density is difficult to record. When the mass ratio is more than 8.0, the dot diameter can fail to be enlarged sufficiently, and a high-quality image without streaky lines is difficult to record.

(Water)

The ink of the present invention is an aqueous ink containing water. The water is preferably deionized water (ion-exchanged water). The content of the water in the ink is preferably 50% by mass or more to 90% by mass or less based on the total mass of the ink.

(Water-Soluble Organic Compound)

The ink of the present invention can contain a water-soluble organic compound. In the present invention, the "water-soluble organic compound" means an "organic compound having a solubility of 500 g/L or more in water at 20° C.". As the water-soluble organic compound, any known water-soluble organic compound usable in an ink can be used. Specific examples of the water-soluble organic compound include alcohols, glycols, alkylene glycols, polyethylene glycols, nitrogen-containing compounds, and sulfur-containing compounds. These water-soluble organic compounds can be used singly or in combination of two or more of them. From the viewpoint of viscosity control of an ink, glycerol, ethylene glycol, diethylene glycol, triethylene glycol, a polyethylene glycol having a weight-average molecular weight of 10,000 or less, 1,3-propanediol, and diglycerol are preferably used. A polyethylene glycol and glycerol are more preferably used. The polyethylene glycol preferably has a number-average molecular weight of 400 or more to 2,000 or less.

The total content of the water-soluble organic compounds in the ink is preferably 35% by mass or less based on the total mass of the ink. In the ink, the content of a water-soluble organic compound that is liquid at 25° C. and has a surface tension of 40 mN/m or less is preferably 5% by mass or less based on the total mass of the ink.

(Resin Particles)

The ink of the present invention preferably contains resin particles. An ink containing resin particles can improve the abrasion resistance (fastness) of a recorded image. In the present invention, the "resin particles" mean "particles made from a resin capable of existing in a dispersion state in an aqueous medium". The resin particles are preferably polyurethane resin particles or acrylic resin particles. When containing a water-soluble resin that is not in a particle state, the ink may have a higher infiltration rate into a recording medium or have a higher viscosity.

The content of the resin particles in the ink is preferably 0.1% by mass or more to 15.0% by mass or less and more preferably 1.0% by mass or more to 8.0% by mass or less based on the total mass of the ink. When the content of the resin is within the range, the image fastness and the ink ejection stability can be further improved.

The resin particles preferably have a volume-based 50% cumulative average particle diameter ($D_{50}$) of 10 nm or more to 200 nm or less and more preferably 50 nm or more to 200 nm or less. The weight-average molecular weight of resin particles can be determined by gel permeation chromatography (GPC) using a polystyrene standard sample. As the GPC apparatus and the like, the following can be used, for example. As the polystyrene standard sample, "PS-1", "PS-2" (trade names; manufactured by Polymer Laboratories) can be used.

Apparatus: Alliance GPC 2695 (trade name; manufactured by Waters)

Column: Shodex KF-806M, quadruple columns (trade name; manufactured by Showa Denko)

Detector: RI (refractive index)

[Polyurethane Resin Particles]

The polyurethane resin particles preferably have a weight-average molecular weight of 5,000 or more to 150,000 or less and more preferably 8,000 or more to 100,000 or less in terms of polystyrene as determined by GPC. When the polyurethane resin particles have a weight-average molecular weight within the range, the image abrasion resistance, the ink storage stability, and the ink ejection stability can be further improved.

The polyurethane resin particles preferably have an acid value of 100 mg KOH/g or less and more preferably 5 mg KOH/g or more to 30 mg KOH/g or less. The acid value of polyurethane resin particles can be determined by titrimetry. For example, resin particles are dissolved in THF, then the solution is subjected to potentiometric titration by using an automatic potential-difference titrator (trade name "AT510", manufactured by Kyoto Electronics Manufacturing) with a titration solution of potassium hydroxide in ethanol, and the acid value can be determined. The polyurethane resin particles preferably have a glass transition temperature (Tg) of −80° C. or more and more preferably −50° C. or more. The polyurethane resin particles preferably have a glass transition temperature (Tg) of 120° C. or less and more preferably 100° C. or less.

[Acrylic Resin Particles]

[Physical Properties of Acrylic Resin Particles]

The acrylic resin particles preferably have a weight-average molecular weight of 5,000 or more to 300,000 or less and more preferably 8,000 or more to 100,000 or less in terms of polystyrene as determined by GPC. When the acrylic resin particles have a weight-average molecular weight within the range, the image abrasion resistance, the ink storage stability, and the ink ejection stability can be further improved.

The acrylic resin particles preferably have an acid value of 150 mg KOH/g or less and more preferably 25 mg KOH/g or more to 140 mg KOH/g or less. The acrylic resin particles preferably have a glass transition temperature (Tg) of −20° C. or more, more preferably −10° C. or more, and particularly preferably 25° C. or more. The acrylic resin particles preferably have a glass transition temperature (Tg) of 120° C. or less and more preferably 100° C. or less.

(Monomer Used for Acrylic Resin Particles)

The monomer used for preparing an acrylic resin constituting the acrylic resin particles is exemplified by (meth)acrylic monomers. Specific examples of the (meth)acrylic monomers include alkyl (meth)acrylates such as methyl (meth)acrylate, ethyl (meth)acrylate, propyl (meth)acrylate, butyl (meth)acrylate, hexyl (meth)acrylate, octyl (meth)acrylate, lauryl (meth)acrylate, and stearyl (meth)acrylate; and (meth)acrylic acids such as acrylic acid and methacrylic acid. The acrylic resin may be a homopolymer of a (meth)acrylic monomer or may be a copolymer of a (meth)acrylic monomer and an additional monomer. Examples of the additional monomer include vinyl esters, olefins, styrenes, crotonic acids, itaconic acids, maleic acids, fumaric acids, acrylamides, allyl compounds, vinyl ethers, vinyl ketones, glycidyl esters, and unsaturated nitriles. When the acrylic resin is a copolymer, the proportion of the unit derived from a (meth)acrylic monomer in the copolymer is preferably 60% by mole or more based on the whole copolymer. Resin particles made from a resin containing an ester bond in the molecular structure thereof are preferably used.

(Surfactant)

The ink of the present invention can contain a surfactant. The surfactant may be any of conventionally known surfactants. Specifically, a nonionic surfactant is preferred. Of the nonionic surfactants, a polyoxyethylene alkyl ether, an ethylene oxide adduct such as acetylene glycol, a fluorochemical surfactant, and a silicon surfactant are preferred, and an ethylene oxide adduct such as acetylene glycol and a fluorochemical surfactant are more preferred. A combination of an ethylene oxide adduct such as acetylene glycol with a fluorochemical surfactant or a silicon surfactant further improves the effect of enlarging the dot diameter and thus is preferred.

Specific examples of the ethylene oxide adduct such as acetylene glycol include Surfynol 104, 440, 465 and Acetylenol E40, E60, E100 (trade names; manufactured by Kawaken Fine Chemicals); and Dynol 604, 607, 800, 810 (trade names; manufactured by Air Products and Chemicals). Specific examples of the fluorochemical surfactant include FS-3100, FS-30, FSN-100 (trade names; manufactured by DuPont); MEGAFACE F-444 (trade name; manufactured by DIC); and DSN403N (trade name; manufactured by Daikin Industries).

The surfactant preferably has an HLB value of 11 or less as determined by Griffin's method. When containing a surfactant having an HLB value of 11 or less, the ink has a comparatively small infiltration rate into a recording medium and thus easily ensures a difference in the solid-liquid separation time between the first pigment and the second pigment. Hence, the image optical density can be further improved, and the dot diameter can be further enlarged to record a higher-quality image.

Of the surfactants having an HLB value of 11 or less, specific examples of the ethylene oxide adduct such as acetylene glycol include Surfynol 104, 440 (trade names; manufactured by Air Products and Chemicals); Acetylenol E40, E60 (trade names; manufactured by Kawaken Fine Chemicals); and Dynol 604, 607, 800, 810 (trade names; manufactured by Air Products and Chemicals). Of the surfactants having an HLB value of 11 or less, specific examples of the fluorochemical surfactant include FS-3100, FS-30, FSN-100 (trade names; manufactured by DuPont); MEGAFACE F-444 (trade name; manufactured by DIC); and DSN403N (trade name; manufactured by Daikin Industries).

The content of the surfactant in the ink is preferably 0.1% by mass or more to 3.0% by mass or less and more preferably 0.2% by mass or more to 1.5% by mass or less based on the total mass of the ink. When the content of the surfactant is less than 0.1% by mass, the dot diameter may be difficult to sufficiently enlarge. When the content of the surfactant is more than 3.0% by mass, the ink is likely to infiltrate into a recording medium, and the effect of improving the image optical density may be insufficient.

(Additives)

The ink of the present invention may contain various additives such as a surfactant other than the above surfactants, a pH adjuster, a surface lubricant, an anticorrosive, an antiseptic agent, an antifungal agent, an antioxidant, a reduction inhibitor, an evaporation accelerator, and a chelating agent, as needed.

The pH adjuster is preferably an amine compound having a buffer capacity. The amine compound having a buffer capacity is exemplified by N-butyl diethanolamine. As the surface lubricant, a fluorochemical surfactant or a polyethylene wax can be used, for example.

(Surface Tension)

The ink of the present invention preferably has a surface tension of 25 mN/m or more to 35 mN/m or less and more preferably 27 mN/m or more to 33 mN/m or less. When an ink has a surface tension of more than 35 mN/m, the dot diameter may be difficult to sufficiently enlarge. When an ink has a surface tension of less than 25 mN/m, strike-through may be likely to occur. The surface tension of an ink can be determined by using a plate type surface tensiometer (for example, trade name "CBVP-A3", manufactured by FACE) under a temperature condition of 25° C. The "surface tension" in the present invention means "static surface tension".

<Ink Cartridge>

An ink cartridge of the present invention includes an ink storage portion storing an ink. In the ink storage portion, the above-described ink of the present invention is stored. The ink storage portion is exemplified by an ink storage portion including an ink storage chamber storing a liquid ink and a negative pressure generating member storage chamber storing a negative pressure generating member that holds an ink therein by negative pressure. An ink cartridge including no ink storage chamber storing a liquid ink but including an ink storage portion configured to hold the whole ink in a negative pressure generating member may be used. An ink cartridge including an ink storage portion and a recording head can also be used.

<Image Recording Method>

An image recording method of the present invention includes an ink application step of applying the above-described ink of the present invention to a recording medium. The image recording method of the present invention preferably further includes a conveyance step of conveying a recording medium and a heating step of heating a recording medium with the ink.

Figure 1:
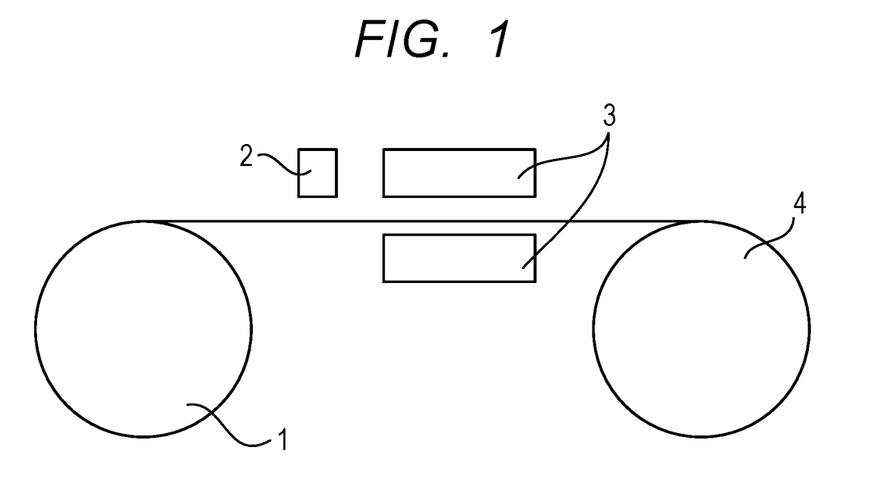
FIG. 1 is a schematic view showing an example of an image recording apparatus used in an image recording method of the present invention.

FIG. 1 is a schematic view showing an example of an image recording apparatus used in the image recording method of the present invention. The image recording apparatus shown in FIG. 1 indicates that a rolled recording medium is used, and the recording medium on which an image has been recorded is rolled up again. In other words, the image recording apparatus shown in FIG. 1 includes a recording medium supply means 1, an ink application means 2, a heating means 3, and a recording medium recovery means 4. The recording medium supply means 1 is a unit for holding and supplying a rolled recording medium. The ink application means 2 is a unit for applying an ink to a recording medium supplied from the recording medium supply means 1. The heating means 3 is a unit for heating the recording medium with the ink. The recording medium recovery means 4 is a unit for rolling up the recording medium onto which the ink has been applied and an image has been recorded. A recording medium is conveyed by a conveyance means including a conveyance member such as a pair of rollers and a belt along the conveyance route indicated by a solid line in FIG. 1, and is processed by the respective units. The recording medium rolled by the recording medium recovery means 4 may be supplied to another device or the like, and the recording medium may be cut into an intended size or be subjected to a process such as bookbinding.

The conveyance speed of a recording medium in the conveyance step is preferably 50 m/min or more and more preferably 100 m/min or more. From the viewpoint of drying characteristics and the like, the ink applying amount per color is preferably 6.5 mg/inch$^2$ or less and more preferably 5.0 mg/inch$^2$ or less. In particular, an ink in an amount of 5.0 mg/inch$^2$ or less per color is preferably applied in a single pass manner because the ink is immediately fixed to suppress paper deformation.

(Ink Application Step)

The ink application step is a step of applying an ink to a recording medium. As the system of applying an ink to a recording medium, an ink jet system is preferably adopted. In other words, the image recording method of the present invention is preferably an ink jet recording method. The ink jet system may be a thermal ink jet system or a piezo ink jet system. The thermal ink jet system is a system in which thermal energy is applied to an ink, and the ink is ejected from an ejection port on a recording head. The piezo ink jet system is a system in which a piezo element is used to eject an ink from an ejection port on a recording head. In the image recording method of the present invention, an ink containing resin particles and having a comparatively high solid concentration is used, and thus the piezo ink jet system is preferably used to apply the ink to a recording medium from the viewpoint of ink ejection stability.

The recording head may be a serial recording head or a full-line recording head. The serial recording head is a recording head that is swept in a direction intersecting the conveyance direction of a recording medium to record an image. The full-line recording head is a recording head having a plurality of nozzles that are arranged in a region covering the maximum width of a recording medium. The full-line ink jet recording head, which can record an image at a higher speed, is preferably used. The full-line ink jet recording head preferably has a nozzle line that is arranged in a direction orthogonal to the conveyance direction of a recording medium. In general, a plurality of full-line ink jet recording heads corresponding to ink colors are preferably provided, and the respective recording heads are preferably arranged side-by-side in parallel along the conveyance direction of a recording medium.

(Heating Step)

The heating step is a step of heating a recording medium with an ink so as to give a surface temperature of 70° C. or more. In the present invention, the "surface temperature of a recording medium with an ink" means the surface temperature of a recording medium at a position of 0.5-second conveyance after an ink is applied to the recording medium. For example, the conveyance speed of a recording medium is assumed to be "V" m/min. On this assumption, the surface temperature of an ink application region X on a recording medium can be measured at a position at which the application region X is conveyed "(V×0.5)/60" m along a conveyance direction from a position at which an ink is applied. In the case of the full-line ink jet recording head, the "position at which an ink is applied" means the position directly below the recording head.

In the heating step, the heating is preferably performed so that the surface temperature of a recording medium with an ink is 80° C. or more. In order to prevent deformation of a recording medium by heat, the heating is preferably performed so that the surface temperature is 140° C. or less. The method of heating a recording medium is exemplified by a method of heating the surface side (ink application side) of a recording medium by a heater, a method of heating the back side, and a method of heating both sides.

A recording medium may be continuously heated before and after ink application. Before ink application, a recording medium is preferably not heated or is preferably heated at a surface temperature of less than 70° C., more preferably heated at 60° C. or less, and particularly preferably heated at 40° C. or less.

During the heating of a recording medium, a pressure roller may be used to press the recording medium, for example. The pressing of a recording medium enables an improvement of the image fixability. When a recording medium is pressed, the recording medium is not necessarily pressed throughout the heating step, and may be pressed in only a part of the heating step. A recording medium may be pressed in multiple steps, or after the heating step, a pressing step may be further provided.

(Recording Medium)

Figure 2:
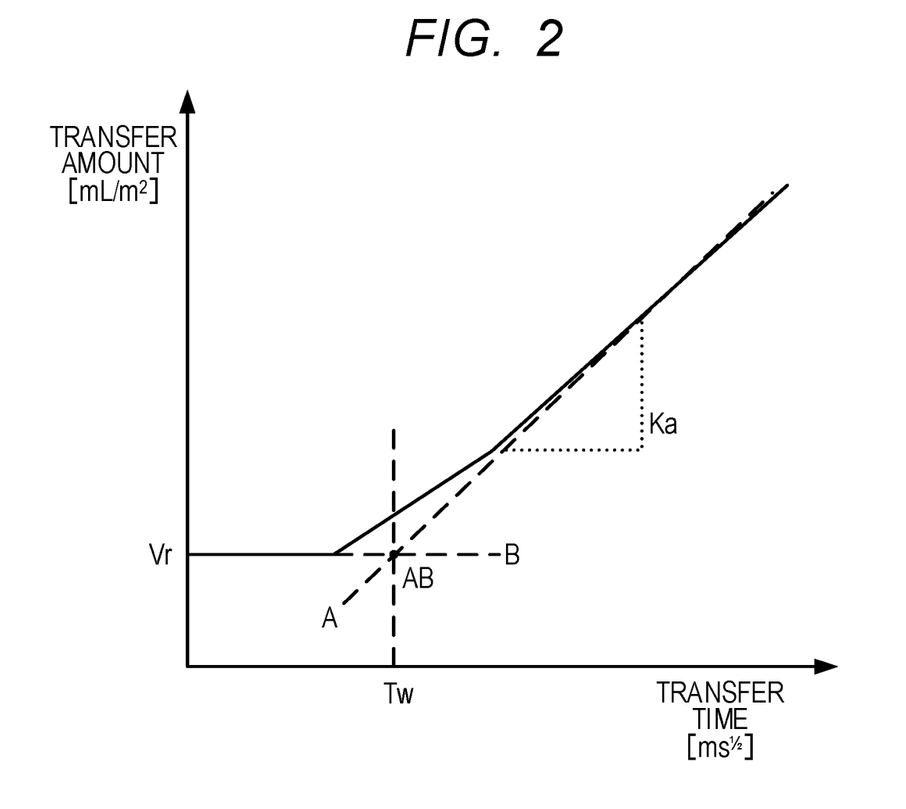
FIG. 2 is a view showing an example of an absorption curve explaining the absorption coefficient Ka of a recording medium.

As the recording medium, any of conventionally used recording media can be used. Specifically, the recording medium preferably has a water absorption coefficient Ka of 0.1 $mL·m^{-2}·ms^{1/2}$ or more, more preferably 0.2 $mL·m^{-2}·ms^{-1/2}$ or more, and particularly preferably 0.3 $mL·m^{-2}·ms^{-1/2}$ or more. As the method of determining the water absorption coefficient Ka of a recording medium, the Bristow's method described in "Test method for liquid absorbability of paper and cardboard", JAPAN TAPPI, Paper pulp test method, No. 51 is used. The Bristow's method is described in many commercially available books and thus is not described in detailed. The absorption coefficient Ka ($mL·m^{-2}·ms^{-1/2}$) is defined by wet time Tw and roughness index Vr ($mL/m^2$). FIG. 2 is a view showing an example of an absorption curve explaining the water absorption coefficient Ka of a recording medium. The absorption curve shown in FIG. 2 is based on an infiltration model in which a liquid comes into contact with a recording medium, and after wet time Tw, starts to infiltrate into the recording medium. The slope of the straight line after the wet time Tw is the absorption coefficient Ka. The absorption coefficient Ka corresponds to the infiltration rate of a liquid into the recording medium. The wet time Tw is, as shown in FIG. 2, calculated as the time to an intersection point AB at which an approximate straight line A for calculating the absorption coefficient Ka by the least squares method intersects with a straight line B represented by "V=Vr" where V is a liquid transfer amount and Vr is a roughness index. The liquid (water) to infiltrate into a recording medium has a temperature of 25° C. In other words, the water absorption coefficient Ka in the present invention is a water absorption coefficient Ka at 25° C.

In order to improve the brightness or opacity of a recording medium, the recording medium preferably has a surface onto which a mineral such as kaolin and talc or a filler such as calcium carbonate, titanium dioxide, and silica is applied. Specifically, calcium carbonate has a higher brightness than those of kaolin and talc, is inexpensive as compared with titanium dioxide, silica, and the like, and thus is preferred. In the recording medium used in the image recording method of the present invention, the content of calcium is preferably 1% by mass or more to 5% by mass or less based on the total mass of all the elements except hydrogen.

The recording medium may be cut into an intended size in advance. The recording medium may also be a rolled long sheet that is cut into an intended size after image recording. Specifically, a rolled long recording medium is preferably used because tension is easily applied.

According to the present invention, an ink capable of improving the optical density of a recorded image and of enlarging the dot diameter to record high-quality images, an ink cartridge including the ink, and an image recording method can be provided.

EXAMPLES

The present invention will next be described in further detail with reference to examples and comparative examples, but the invention is not intended to be limited to the following examples without departing from the scope of the invention. The component amounts with "part" or "%" are based on mass unless otherwise noted.

<Preparation of Pigment Dispersion Liquid (First Pigment)>

(Pigment Dispersion Liquid 1)

First, 20 g of carbon black (solid content), 7 mmol of monosodium ((4-aminobenzoylamino)-methane-1,1-diyl) bisphosphonate, 20 mmol of nitric acid, and 200 mL of pure water were mixed. The carbon black used had a specific surface area of 220 m²/g and a DBP oil absorption amount of 105 mL/100 g. The whole was mixed with a Silverson mixer under a room temperature condition at 6,000 rpm. To the resulting mixture after mixing for 30 minutes, 20 mmol of sodium nitrite dissolved in a small amount of water was slowly added. By the addition of sodium nitrite, the mixture temperature reached 60° C. The mixture was reacted for 1 hour in this condition. After the reaction, an aqueous sodium hydroxide solution was added to adjust the pH of the mixture to 10. After 30 minutes, 20 mL of pure water was added, and the mixture was subjected to diafiltration through a spectrum membrane. Next, sodium ions were replaced with ammonium ions by an ion exchange method, and the product was adjusted to have a pigment content of 10.0%, giving a pigment dispersion liquid 1. The obtained pigment dispersion liquid contains a self-dispersible pigment in which the group represented by Formula (1) containing ammonium ions as the counter ion is bonded to the particle surface of the pigment, in a dispersion state.

[Chemical Formula]

(1)

(Pigment Dispersion Liquid 2)

First, 20 g of carbon black having a specific surface area of 185 m²/g and a DBP oil absorption amount of 160 mL/100 g was mixed with 150 g of ion-exchanged water, and the mixture was heated to 50° C. while stirred with a dissolver. Next, 222 g of an aqueous sodium hypochlorite solution (an effective chlorine concentration of 12%) was added dropwise over 3.5 hours under a temperature condition of 50 to 60° C. Immediately after the completion of the dropwise addition, 3-mm glass beads were added, and the mixture was stirred at 50° C. for 30 minutes, giving a reaction liquid containing a surface-modified carbon black. The obtained reaction liquid was filtered through a 400-mesh wire net to separate the glass beads and the unreacted carbon black from the reaction liquid. To the separated reaction liquid, 5% aqueous sodium hydroxide solution was added to adjust the pH to 7.5. Then, the liquid was demineralized and purified through an ultrafiltration membrane and was further concentrated to a pigment concentration of 17%, giving a concentrated liquid. The concentrated liquid was subjected to a centrifuge separator to remove coarse particles and then was filtered through a 0.6-μm filter. To the filtrate, ion-exchanged water was added to adjust the pigment content to 10.0%, giving a pigment dispersion liquid 2.

<Preparation of Pigment Dispersion Liquid (Second Pigment)>

(Pigment Dispersion Liquid 3)

A solution of 5 g of concentrated hydrochloric acid in 5.5 g of water was cooled to 5° C., and 1.96 g of p-aminobenzenesulfonic acid was added. The solution was constantly maintained at a temperature of 10° C. or less, and a solution of 2.2 g of potassium nitrite in 9 g of water at 5° C. was added. After stirring for 15 minutes, 6 g of carbon black (solid content, a specific surface area of 220 m²/g, a DBP oil absorption amount of 105 mL/100 g) was added under stirring, and the mixture was stirred for another 15 minutes, giving a slurry. The obtained slurry was filtered through a filter paper (trade name "Standard filter paper No. 2", manufactured by ADVANTEC), and the particles were thoroughly cooled with water and dried in an oven at 110° C. Potassium ions were replaced with ammonium ions by an ion exchange method, and the product was adjusted to have a pigment content of 10.0%, giving a pigment dispersion liquid 3. The obtained pigment dispersion liquid 3 contains a self-dispersible pigment in which a benzenesulfonic acid group containing an ammonium ion as the counter ion is bonded to the particle surface of the pigment, in a dispersion state.

(Pigment Dispersion Liquid 4)

A 500-mL recovery flask equipped with a mechanical stirrer was placed in the chamber of an ultrasonic generator. In the recovery flask, 6 g of a pigment dispersion resin and 50 mL of tetrahydrofuran were placed, and the whole was thoroughly stirred while sonicated. The pigment dispersion resin used was a styrene-acrylic acid resin (a weight-average molecular weight of 7,800, an acid value of 90 mg KOH/g). In another container, 6 g of carbon black (trade name "FW18", manufactured by Degussa, a DBP oil absorption amount of 161 mL/100 g, a primary particle diameter of 15 nm) and 50 mL of tetrahydrofuran were placed. The content was mixed by using a planetary stirrer (manufactured by Kurabo Industries Ltd.) until the particle surface of the carbon black was sufficiently wet with tetrahydrofuran. The resulting mixture was added into the recovery flask, and the whole was thoroughly mixed. An aqueous solution containing potassium hydroxide in such an amount as to give a resin neutralization rate of 100% was added dropwise to invert the phase, and the resulting mixture was premixed for 60 minutes. Next, the mixture was dispersed for 2 hours by using a Nanomizer (trade name "NM2-L200AR", manufactured by Yoshida Kikai Co., Ltd.), giving a dispersion. From the obtained dispersion, tetrahydrofuran was removed by evaporation with a rotary evaporator to adjust the concentration, giving a pigment dispersion liquid 4 having a pigment content of 10.0%.

(Pigment Dispersion Liquid 5)

The same procedure as for the pigment dispersion liquid 4 was performed with the exception that a styrene-acrylic acid resin (a weight-average molecular weight of 11,000, an acid value of 150 mg KOH/g) was used as the pigment dispersion resin, giving a pigment dispersion liquid 5 having a pigment content of 10.0%.

(Pigment Dispersion Liquid 6)

The same procedure as for the pigment dispersion liquid 4 was performed with the exception that a block polymer of ethoxytriethylene glycol methacrylate/benzyl methacrylate/methacrylic acid=7.6/13/13 (mass ratio) (a weight-average molecular weight of 5,200, an acid value of 142 mg KOH/g) was used as the pigment dispersion resin, giving a dispersion liquid having a pigment content of 10.0%. To the obtained dispersion liquid, 1.13 g of a crosslinking agent (trade name "Denacol EX-321 L", manufactured by Nagase Chemical) was added. The whole was stirred at 80° C. for 8 hours to undergo crosslinking reaction, and then the pH was adjusted to about 8.5, giving a pigment dispersion liquid 6 having a pigment content of 10.0%.

(Pigment Dispersion Liquid 7)

The same procedure as for the pigment dispersion liquid 4 was performed with the exception that trade name "FASTOGEN Super MagentaR" (a magenta pigment, manufactured by DIC) was used in place of carbon black, giving a pigment dispersion liquid 7 having a pigment content of 10.0%.

<Preparation of Pigment Dispersion Liquid (Comparative Pigment)>

(Pigment Dispersion Liquid 8)

The same procedure as for the pigment dispersion liquid 4 was performed with the exception that a styrene-acrylic acid resin (a weight-average molecular weight of 40,000, an acid value of 90 mg KOH/g) was used as the pigment dispersion resin, giving a pigment dispersion liquid 8 having a pigment content of 10.0%.

(Pigment Dispersion Liquid 9)

To 3 L of 1.0 mol/L aqueous sodium peroxodisulfate solution, 100 g of carbon black (a specific surface area of 220 m$^2$/g, a DBP oil absorption amount of 105 mL/100 g) was added to undergo oxidation at a temperature of 60° C. and a stirring speed of 0.12 s$^{-1}$ for 10 hours. After filtration, 1.0 mol/L aqueous potassium hydroxide solution was added to neutralize hydrophilic groups on the particle surface of the pigment, and then the product was subjected to centrifugal separation. Through an ultrafiltration membrane having a molecular weight cut off of 50,000 (trade name "AHP-1010", manufactured by Asahi Kasei Corporation), salts remaining in the supernatant liquid were separated, and the filtrate was adjusted to have a pigment content of 10.0%, giving a pigment dispersion liquid 9.

<Measurement of Particle Diameter Increase Rate>

To 0.9 mL of 0.01% aqueous dispersion liquid of a first pigment, 0.1 mL of 10.0 mM aqueous calcium chloride solution was added, and then the particle diameter of the solid content was measured for 600 seconds at intervals of 2 seconds by using a particle size analyzer (trade name "FPAR-100", manufactured by Otsuka Electronics). After the completion of the measurement, the initial slope of particle diameter changes was determined, and the particle diameter increase rate $S_1$ (nm/second) of the solid content was calculated. Separately, to 0.9 mL of 0.01% aqueous dispersion liquid of a second pigment, 0.1 mL of 5.0 mM hydrochloric acid was added, and then the particle diameter of the solid content was measured for 600 seconds at intervals of 2 seconds by using a particle size analyzer (trade name "FPAR-100", manufactured by Otsuka Electronics). After the completion of the measurement, the initial slope of particle diameter changes was determined, and the particle diameter increase rate $S_2$ (nm/second) of the solid content was calculated.

<Preparation of Resin Particles (Resin)>

First, 100 parts of ethyl acrylate, 9 parts of methyl methacrylate, 5 parts of ethyl methacrylate, 0.5 part of acrylic acid, and 0.5 part of methacrylic acid were mixed, giving a monomer mixture. In a flask equipped with a stirrer, a temperature controller, and a reflux condenser, 40 parts of water and 0.4 part of sodium persulfate were placed, and the content was heated to 70° C. Into the flask, 115 parts of the prepared monomer mixture, 0.02 part of n-butyl mercaptan, 1 part of sodium dodecylbenzenesulfonate, and 60 parts of water were added, and the whole was stirred and emulsified, giving a preemulsion. The whole preemulsion taken out of the flask was continuously supplied to another flask warmed at 80° C. over 3 hours and was stirred. Then, the mixture was stirred and polymerized at 80° C. for 2.5 hours, giving a dispersion liquid of resin particles 1 as acrylic resin particles. The obtained dispersion liquid had a solid concentration of 40%. The resin particles 1 had a number-average particle diameter of 80 nm.

<Preparation of Ink>

Components (unit: %) shown in upper rows in Tables 1-1 to 1-4 were mixed and thoroughly stirred, and the mixture was filtered through a glass filter (trade name "AP20", manufactured by MILLIPORE), giving each ink. The abbreviations of the components in Tables 1-1 to 1-4 are as shown below. The particle diameter increase rate $S_1$ (nm/second) and the particle diameter increase rate $S_2$ (nm/second) are shown in lower rows in Tables 1-1 to 1-4. The mass ratio of the content (% by mass) of a first pigment to the content (% by mass) of a second pigment (first pigment/second pigment) in an ink is shown in a lower row in Tables 1-1 to 1-4.

COJ400: Cab-o-jet400 (trade name; manufactured by Cabot), self-dispersible black pigment COJ450C: Cab-o-jet450C (trade name; manufactured by Cabot), self-dispersible cyan pigment COJ465M: Cab-o-jet465M (trade name; manufactured by Cabot), self-dispersible magenta pigment COJ480V: Cab-o-jet480V (trade name; manufactured by Cabot), self-dispersible magenta pigment COJ470Y: Cab-o-jet470Y (trade name; manufactured by Cabot), self-dispersible yellow pigment COJ200: Cab-o-jet200 (trade name; manufactured by Cabot), sulfonic acid group-modified self-dispersible black pigment COJ250C: Cab-o-jet250 (trade name; manufactured by Cabot), self-dispersible cyan pigment COJ265M: Cab-o-jet265 (trade name; manufactured by Cabot), self-dispersible magenta pigment COJ270Y: Cab-o-jet270 (trade name; manufactured by Cabot), self-dispersible yellow pigment COJ300: Cab-o-jet300 (trade name; manufactured by Cabot), carboxylic acid group-modified self-dispersible black pigment U9370: alberdingk U9370 (trade name; manufactured by Alberdingk), urethane resin particles AC2714: alberdingk AC2714 (trade name; manufactured by Alberdingk), acrylic resin particles AE100: Acetylenol E100 (trade name; manufactured by Kawaken Fine Chemicals), acetylene glycol type surfactant [HLB value: 16.3]

Dy800: Dyno1800 (trade name; manufactured by Air Products and Chemicals) [HLB value: 8]

FS-3100: Capstone FS-3100 (trade name; manufactured by DuPont) [HLB value: 9.8]

TABLE 1-1

| | | Ink formulation, characteristics | | | | | | | | | |
|---|---|---|---|---|---|---|---|---|---|---|---|
| | | Example | | | | | | | | | |
| | | 1 | 2 | 3 | 4 | 5 | 6 | 7 | 8 | 9 | 10 |
| First pigment | Pigment dispersion liquid 1 | 3.0 | | 3.0 | 3.0 | 3.0 | 3.0 | | 3.0 | 2.5 | 3.6 |
| | Pigment dispersion liquid 2 | | | | | | | | | | |
| | COJ400 | | 3.0 | | | | | 3.0 | | | |
| Second pigment | COJ200 | 1.0 | 1.0 | 1.0 | 1.0 | | | | | | |
| | Pigment dispersion liquid 3 | | | | | | | | 1.0 | 1.5 | 0.5 |

TABLE 1-1-continued

Ink formulation, characteristics

| | | Example | | | | | | | | | |
|---|---|---|---|---|---|---|---|---|---|---|---|
| | | 1 | 2 | 3 | 4 | 5 | 6 | 7 | 8 | 9 | 10 |
| | Pigment dispersion liquid 4 | | | | | 1.0 | | | | | |
| | Pigment dispersion liquid 5 | | | | | | 1.0 | | | | |
| | Pigment dispersion liquid 6 | | | | | | | 1.0 | | | |
| Solvent | Glycerol | 20.0 | 20.0 | 20.0 | 20.0 | 20.0 | 20.0 | 20.0 | 20.0 | 20.0 | 20.0 |
| | PEG1000 | 10.0 | 10.0 | 10.0 | 10.0 | 10.0 | 10.0 | 10.0 | 10.0 | 10.0 | 10.0 |
| Resin | U9370 | 5.0 | 5.0 | 5.0 | 5.0 | 5.0 | 5.0 | 5.0 | 5.0 | 5.0 | 5.0 |
| | AC2714 | | | | | | | | | | |
| | Resin particles 1 | | | | | | | | | | |
| Surfactant | AE100 | 0.4 | 0.4 | | | | | | | | |
| | Dy800 | | | 1.0 | | 1.0 | 1.0 | 1.0 | 1.0 | 1.0 | 1.0 |
| | FS3100 | | | | 1.0 | | | | | | |
| Water | | Remainder | Remainder | Remainder | Remainder | Remainder | Remainder | Remainder | Remainder | Remainder | Remainder |
| Particle diameter increase rate $S_1$ (nm/second) | | >2.0 | >2.0 | >2.0 | >2.0 | >2.0 | >2.0 | >2.0 | >2.0 | >2.0 | >2.0 |
| Particle diameter increase rate $S_2$ (nm/second) | | 0.23 | 0.23 | 0.23 | 0.23 | 0.46 | 0.00 | 0.03 | 0.18 | 0.18 | 0.18 |
| First pigment/second pigment | | 3.0 | 3.0 | 3.0 | 3.0 | 3.0 | 3.0 | 3.0 | 3.0 | 1.7 | 7.9 |

TABLE 1-2

Ink formulation, characteristics

| | | Example | | | | | | | | | |
|---|---|---|---|---|---|---|---|---|---|---|---|
| | | 11 | 12 | 13 | 14 | 15 | 16 | 17 | 18 | 19 | 20 |
| First pigment | Pigment dispersion liquid 1 | 4.0 | 4.0 | 4.0 | 3.0 | 3.0 | 3.0 | | | | 2.0 |
| | Pigment dispersion liquid 2 | | | | | | | 3.0 | 3.0 | 5.0 | 1.0 |
| | COJ400 | | | | | | | | | | |
| Second pigment | COJ200 | 0.5 | 1.0 | 2.0 | 1.0 | 1.0 | 0.5 | 1.0 | | | 1.0 |
| | Pigment dispersion liquid 3 | | | | | | | | 1.0 | 1.0 | |
| | Pigment dispersion liquid 4 | | | | | | 0.5 | | | | |
| | Pigment dispersion liquid 5 | | | | | | | | | | |
| | Pigment dispersion liquid 6 | | | | | | | | | | |
| Solvent | Glycerol | 20.0 | 20.0 | 20.0 | 20.0 | 20.0 | 20.0 | 20.0 | 20.0 | 20.0 | 20.0 |
| | PEG1000 | 10.0 | 9.0 | 7.5 | 10.0 | 10.0 | 10.0 | 10.0 | 10.0 | 8.0 | 10.0 |
| Resin | U9370 | 5.0 | 5.0 | 5.0 | | | 5.0 | 5.0 | 5.0 | 5.0 | 5.0 |
| | AC2714 | | | | 5.0 | | | | | | |
| | Resin particles 1 | | | | | 5.0 | | | | | |
| Surfactant | AE100 | | | | | | | 0.3 | 0.3 | | |
| | Dy800 | 1.0 | 1.0 | 1.0 | 1.0 | 1.0 | 1.0 | | | 1.0 | 1.0 |
| | FS3100 | | | | | | | | | | |
| Water | | Remainder | Remainder | Remainder | Remainder | Remainder | Remainder | Remainder | Remainder | Remainder | Remainder |
| Particle diameter increase rate $S_1$ (nm/second) | | >2.0 | >2.0 | >2.0 | >2.0 | >2.0 | >2.0 | >2.0 | >2.0 | >2.0 | >2.0 |
| Particle diameter increase rate $S_2$ (nm/second) | | 0.23 | 0.23 | 0.23 | 0.23 | 0.23 | 0.31 | 0.23 | 0.18 | 0.18 | 0.23 |
| First pigment/second pigment | | 8.0 | 4.0 | 2.0 | 3.0 | 3.0 | 3.0 | 3.0 | 3.0 | 5.0 | 3.0 |

TABLE 1-3

Ink formulation, characteristics

| | | Example | | | | |
|---|---|---|---|---|---|---|
| | | 21 | 22 | 23 | 24 | 25 |
| First pigment | COJ450C | 2.0 | | | | |
| | COJ465M | | 3.5 | | | 3.0 |
| | COJ480V | | | 3.5 | | |
| | COJ470Y | | | | 3.0 | |
| Second pigment | COJ250C | 0.5 | | | | |
| | COJ265M | | 1.0 | 1.0 | | |
| | COJ270Y | | | | 1.0 | |
| | Pigment dispersion liquid 7 | | | | | 1.0 |
| Solvent | Glycerol | 20.0 | 20.0 | 20.0 | 20.0 | 20.0 |
| | PEG1000 | 10.0 | 10.0 | 10.0 | 10.0 | 10.0 |
| Resin | U9370 | 5.0 | 5.0 | 5.0 | 5.0 | 5.0 |
| Surfactant | Dy800 | 0.8 | 0.8 | 0.8 | 0.8 | 0.8 |
| Water | | Remainder | Remainder | Remainder | Remainder | Remainder |
| Particle diameter increase rate $S_1$ (nm/second) | | >2.0 | >2.0 | >2.0 | >2.0 | >2.0 |

TABLE 1-3-continued

Ink formulation, characteristics

| | Example | | | | |
|---|---|---|---|---|---|
| | 21 | 22 | 23 | 24 | 25 |
| Particle diameter increase rate $S_2$(nm/second) | 0.11 | 0.08 | 0.08 | 0.00 | 0.31 |
| First pigment/second pigment | 4.0 | 3.5 | 3.5 | 3.0 | 3.0 |

TABLE 1-4

Ink formulation, characteristics

| | | Comparative Example | | | | | | | | |
|---|---|---|---|---|---|---|---|---|---|---|
| | | 1 | 2 | 3 | 4 | 5 | 6 | 7 | 8 | 9 |
| First pigment | Pigment dispersion liquid 1 | 4.0 | | | | 3.0 | 3.0 | 3.0 | 3.6 | 2.4 |
| | COJ400 | | 4.0 | | | | | | | |
| | COJ450C | | | 2.5 | | | | | | |
| Second pigment | COJ200 | | | | 4.0 | | | | 0.4 | 1.6 |
| | Pigment dispersion liquid 4 | | | | 1.0 | | | | | |
| Comparative pigment | COJ300 | | | | | 1.0 | | | | |
| | Pigment dispersion liquid 8 | | | | | | 1.0 | | | |
| | Pigment dispersion liquid 9 | | | | | | | 1.0 | | |
| Solvent | Glycerol | 20.0 | 20.0 | 20.0 | 20.0 | 20.0 | 20.0 | 20.0 | 20.0 | 20.0 |
| | PEG1000 | 10.0 | 10.0 | 10.0 | 10.0 | 10.0 | 10.0 | 10.0 | 10.0 | 10.0 |
| Resin | U9370 | 5.0 | 5.0 | 5.0 | 5.0 | 5.0 | 5.0 | 5.0 | 5.0 | 5.0 |
| Surfactant | Dy800 | 1.0 | 1.0 | 0.8 | 1.0 | 1.0 | 1.0 | 1.0 | 1.0 | 1.0 |
| Water | | Re-mainder | Re-mainder | Re-mainder | Re-mainder | Re-mainder | Re-mainder | Re-mainder | Re-mainder | Re-mainder |
| Particle diameter increase rate $S_1$(nm/second) | | >2.0 | >2.0 | >2.0 | — | >2.0 | >2.0 | >2.0 | >2.0 | >2.0 |
| Particle diameter increase rate $S_2$(nm/second) | | — | — | — | 0.00 | >2.0 | 0.71 | 0.69 | 0.23 | 0.23 |
| First pigment/second pigment | | — | — | — | 4.0 | 3.0 | 3.0 | 3.0 | 9.0 | 1.5 |

<Evaluation>

An ink jet recording apparatus equipped with a piezo type ink jet head (trade name "KJ4", manufactured by Kyocera, a nozzle density of 600 dpi) and having such a structure as shown in FIG. 1 was prepared. The ink jet recording apparatus was used to perform the evaluations described below. The recording conditions were a temperature of 25° C., a relative humidity of 55%, an ink ejection frequency of 40 kHz, a recording medium conveyance speed of 100 m/s, and an ink ejection volume of about 12 pL/dot. With the above ink jet recording apparatus, the condition in which a single dot of an ink drop is applied to a unit area of 1/600 inch×1/600 inch at a resolution of 600 dpi×600 dpi is defined as a recording duty of 100%.

(Optical Density of Image)

The above ink jet recording apparatus with each ink was used to record a solid image of 3 cm×3 cm (a recording duty of 100%) on a recording medium. As the recording medium, "JetScript DL9084" (trade name; manufactured by Mitsubishi HiTec Paper Europe GmbH, a basis weight of 88 g/m²) was used. The optical density of a recorded image was determined by using a reflection densitometer (trade name "RD19I", manufactured by GretagMacbeth), and was evaluated based on the following criteria. The results are shown in Table 2. In the present invention, a sample evaluated as "A" or "B" was regarded as a preferred level, and a sample evaluated as "C" was regarded as an unacceptable level.

[Black Ink, Cyan Ink]
A: The optical density was 1.45 or more.
B: The optical density was not less than 1.40 and less than 1.45.
C: The optical density was less than 1.40.

[Magenta Ink, Yellow Ink]
A: The optical density was 1.30 or more.
B: The optical density was not less than 1.25 and less than 1.30.
C: The optical density was less than 1.25.

(Dot Diameter)

The above ink jet recording apparatus with each ink was used to record an image having equally arranged dots and having a recording duty of 0.44% on a recording medium. As the recording medium, "JetScript DL9084" (trade name; manufactured by Mitsubishi HiTec Paper Europe GmbH, a basis weight of 88 g/m²) was used. The dot diameter of a recorded image was determined by using a dot diameter measurement function of an image evaluation system (trade name "PERSONAL IAS", manufactured by QEA), and was evaluated based on the following criteria. The results are shown in Table 2. The threshold level for dot recognition was "55%" for cyan inks and black inks and was "60%" for magenta inks and yellow inks. Ten dots in different areas were measured, and the average thereof was regarded as the "dot diameter". In the present invention, a sample evaluated as "A" or "B" was regarded as a preferred level, and a sample evaluated as "C" was regarded as an unacceptable level.
A: The dot diameter was 63 μm or more.
B: The dot diameter was not less than 60 μm and less than 63 μm.
C: The dot diameter was less than 60 μm.

TABLE 2

| | | Image optical density | Dot diameter |
|---|---|---|---|
| Example | 1 | A | B |
| | 2 | A | B |
| | 3 | A | A |
| | 4 | A | A |
| | 5 | A | B |
| | 6 | A | A |
| | 7 | A | A |
| | 8 | A | A |
| | 9 | B | A |
| | 10 | A | B |

TABLE 2-continued

|  |  | Image optical density | Dot diameter |
|---|---|---|---|
|  | 11 | A | B |
|  | 12 | A | A |
|  | 13 | B | A |
|  | 14 | A | A |
|  | 15 | A | A |
|  | 16 | A | A |
|  | 17 | B | A |
|  | 18 | B | A |
|  | 19 | A | A |
|  | 20 | A | A |
|  | 21 | A | A |
|  | 22 | A | A |
|  | 23 | A | A |
|  | 24 | A | A |
|  | 25 | A | A |
| Comparative Example | 1 | B | C |
|  | 2 | B | C |
|  | 3 | A | C |
|  | 4 | C | A |
|  | 5 | B | C |
|  | 6 | C | A |
|  | 7 | A | C |
|  | 8 | A | C |
|  | 9 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-206518, filed Oct. 21, 2016, which is hereby incorporated by reference herein in its entirety.

What is claimed is:

1. An ink comprising:
(a) a first pigment;
(b) a second pigment; and
(c) water,
wherein the first pigment satisfies condition 1:
condition 1: when, to a first pigment dispersion liquid comprising the first pigment and water and having a content of the first pigment of 0.01% by mass, calcium chloride is added so as to give a concentration of 1.0 mM, a particle diameter increase rate of a solid content is 2.0 nm/second or more,
wherein the second pigment satisfies condition 2:
condition 2: when, to a second pigment dispersion liquid comprising the second pigment and water and having a content of the second pigment of 0.01% by mass, hydrochloric acid is added so as to give a concentration of 0.5 mM, a particle diameter increase rate of a solid content is 0.5 nm/second or less, and
wherein a content (% by mass) of the first pigment relative to a content (% by mass) of the second pigment based on a total mass of the ink is 1.7 times or more to 8.0 times or less in terms of mass ratio.

2. The ink according to claim 1, wherein the first pigment is a phosphonic acid type self-dispersible pigment in which a phosphonic acid group is bonded to a particle surface of the pigment directly or through an additional atomic group.

3. The ink according to claim 1, wherein the second pigment is a sulfonic acid type self-dispersible pigment in which a sulfonic acid group is bonded to a particle surface of the pigment directly or through an additional atomic group.

4. The ink according to claim 1, wherein the second pigment is a resin-dispersed pigment dispersed by a resin having (i) a weight-average molecular weight of 3,000 or more to 15,000 or less and (ii) an acid value of 100 mg KOH/g or more.

5. The ink according to claim 1, further comprising a surfactant having an HLB value of 11 or less, as determined by Griffin's method.

6. An ink cartridge comprising:
an ink; and
an ink storage portion storing the ink,
wherein the ink is the ink according to claim 1.

7. An image recording method comprising:
an ink application step of applying an ink to a recording medium,
wherein the ink is the ink according to claim 1.

8. The image recording method according to claim 7, wherein the ink, in an amount of 5.0 mg/inch$^2$ or less per color, is applied to the recording medium in a single pass manner.

9. The ink according to claim 1, wherein the content (% by mass) of the first pigment relative to the content (% by mass) of the second pigment based on a total mass of the ink is 2.0 times or more to 5.0 times or less in terms of mass ratio.

10. The ink according to claim 1, wherein the content (% by mass) of the first pigment in the ink is 0.1% by mass or more to 10.0% by mass or less.

11. The ink according to claim 1, wherein the content (% by mass) of the second pigment in the ink is 0.1% by mass or more to 10.0% by mass or less.

12. The ink according to claim 4, wherein the resin has the acid value of 100 mg KOH/g or more to 200 mg KOH/g or less.

* * * * *